(12) United States Patent
Kudo et al.

(10) Patent No.: US 6,656,598 B2
(45) Date of Patent: Dec. 2, 2003

(54) AQUEOUS COATING COMPOSITION

(75) Inventors: Muneo Kudo, Annaka (JP); Masaaki Yamaya, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/973,768

(22) Filed: Oct. 11, 2001

(65) Prior Publication Data

US 2002/0072581 A1 Jun. 13, 2002

(30) Foreign Application Priority Data

Oct. 13, 2000 (JP) .................................. 2000-314034

(51) Int. Cl.$^7$ .............................. B32B 9/04; B05D 3/02; C08G 77/26
(52) U.S. Cl. ........................ 428/447; 428/446; 427/387; 528/12; 528/38
(58) Field of Search .................. 528/10, 12, 25, 528/29, 38; 428/446, 447; 427/387

(56) References Cited

U.S. PATENT DOCUMENTS

| | | | | |
|---|---|---|---|---|
| 3,905,823 A | * | 9/1975 | Piskoti | .................... 106/38.22 |
| 4,299,879 A | | 11/1981 | Martin | |
| 4,373,043 A | * | 2/1983 | Yagi et al. | .................... 524/130 |
| 5,739,369 A | | 4/1998 | Matsumura et al. | |
| 5,742,943 A | * | 4/1998 | Chen | ............................ 2/168 |
| 5,873,931 A | | 2/1999 | Scholz et al. | |
| 6,306,514 B1 | * | 10/2001 | Weikel et al. | .............. 428/451 |

FOREIGN PATENT DOCUMENTS

| | | |
|---|---|---|
| EP | 0 488 681 | 6/1992 |
| EP | 0 780 421 | 6/1997 |
| WO | WO 96/18691 | 6/1996 |

* cited by examiner

*Primary Examiner*—Robert Dawson
*Assistant Examiner*—Michael J. Feely
(74) *Attorney, Agent, or Firm*—Oblon, Spivak, McClelland, Maier & Neustadt, P.C.

(57) ABSTRACT

An aqueous coating composition including (A) an amino group-containing organopolysiloxane, (B) water and (C) at least one of a surface-active agent represented by the general formula (I):

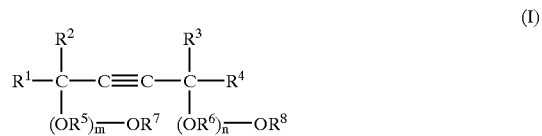

(I)

wherein $R^1$ to $R^4$ are a $C_1$–$C_8$ alkyl group, $R^5$ and $R^6$ are a $C_1$–$C_6$ alkylene group, $R^7$ and $R^8$ are selected from a hydrogen atom, a $C_1$–$C_6$ alkyl group and a $C_2$–$C_6$ acyl group, and m and n are an integer of 0 to 40, provided that m and n are not 0 at the same time and that of m+n ranges from 1 to 40 on the average; and a nonionic surface-active agent containing a perfluoroalkyl group and an alkylene oxide group. In the composition, (C) is present in a content of 0.01% to 5% by weight based on the total of (A), (B) and (C), and an alcohol is present in an amount not more than 10% by weight of the composition. The aqueous coating composition has superior uniform-coating properties and storage stability.

19 Claims, No Drawings

AQUEOUS COATING COMPOSITION

BACKGROUND OF THE INVENTION

1. Field of the Invention

This invention relates to an aqueous coating composition which contains an amino group-containing organopolysiloxane and a surface-active agent and has superior uniform-coating properties and storage stability.

2. Description of the Prior Art

In recent years, environmental regulations have become severe in relation to volatile organic compounds and to how toxicity and so forth be lessened. Also, from the viewpoint of saving of natural resources, coating compositions are being changed over from a system making use of organic compounds as solvents to a system making use of water. Amino group-containing organopolysiloxanes can be made water-soluble even in a high concentration because of the polar effect of amino groups, and are used as primers for metal or metal oxide surfaces, additives of acrylic latex sealants, coupling agents for particle surfaces of inorganic fillers such as silica, and binding agents of aqueous coating materials. They are also used as aqueous materials for the formation of organic glass films in semiconductor device fabrication processes.

However, aqueous solutions of amino group-containing organopolysiloxanes have a high surface tension, and hence there has been a problem that the phenomenon of cissing may occur when coated on the surfaces of metals, metal oxides or organic coatings, in particular, on flat-plate surfaces, so that any uniform coatings can not be formed.

To solve this problem, a method is known in which a surface-active agent is added. There, however, has been a problem that the surface-active agent may decompose on lapse of time because of a strong alkalinity due to the amino groups, and its effect does not last.

SUMMARY OF THE INVENTION

An object of the present invention is to provide an aqueous coating composition which contains an amino group-containing organopolysiloxane and a surface-active agent and has superior uniform-coating properties and storage stability.

To solve the above problems, the present inventors made extensive studies. As the result, they have discovered that an aqueous coating composition as described below can solve the problems, and have accomplished the present invention.

That is, the present invention provides an aqueous coating composition comprising (A) an amino group-containing organopolysiloxane, (B) water and (C) at least one of i) a surface-active agent represented by the following general formula (I):

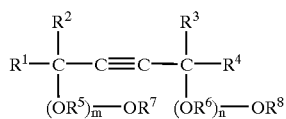

wherein $R^1$ to $R^4$ are each independently an alkyl group having 1 to 8 carbon atoms, $R^5$ and $R^6$ are each independently an alkylene group having 1 to 6 carbon atoms, $R^7$ and $R^8$ are each independently a member selected from the group consisting of a hydrogen atom, an alkyl group having 1 to 6 carbon atoms and an acyl group having 2 to 6 carbon atoms, and m and n are each an integer of 0 to 40, provided that m and n are not 0 at the same time and that the value of m+n is a number of 1 to 40 on the average; and ii) a nonionic surface-active agent containing a perfluoroalkyl group and an alkylene oxide group;

the component (C) being present in a content of from 0.01% by weight to 5% by weight based on the total weight of the components (A), (B) and (C), and an alcohol being present in the composition in an amount not more than 10% by weight of the total weight of the composition.

DESCRIPTION OF THE PREFERRED EMBODIMENTS

The present invention is described below in detail.

The aqueous coating composition of the present invention comprises (A) an amino group-containing organopolysiloxane, (B) water and (C) at least one of a specific surface-active agent and a nonionic surface-active agent.

The surface-active agents are described here first.

(C) Surface-Active Agents

One of the surface-active agents used in the present invention is an addition product of alkylene oxide to acetylene glycol, represented by the following general formula (I):

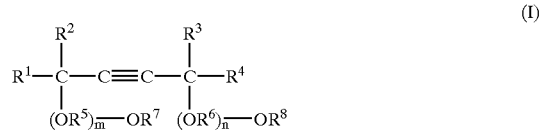

wherein $R^1$ to $R^4$ are each independently an alkyl group having 1 to 8 carbon atoms, $R^5$ and $R^6$ are each independently an alkylene group having 1 to 6 carbon atoms, $R^7$ and $R^8$ are each independently a group selected from a hydrogen atom, an alkyl group having 1 to 6 carbon atoms and an acyl group having 2 to 6 carbon atoms, and m and n are each an integer of 0 to 40, provided that m and n are not 0 at the same time and that the value of m+n is a number of 1 to 40 on the average.

In the compound represented by the general formula (I), the alkyl group represented by $R^1$ to $R^4$ may be straight-chain or branched, and may include, e.g., a methyl group, an ethyl group, a propyl group, an isopropyl group, a n-butyl group, an isobutyl group, a sec-butyl group, a t-butyl group, a pentyl group, a hexyl group, a heptyl group and an octyl group. The alkylene group represented by $R^5$ and $R^6$ may include, e.g., a methylene group, an ethylene group, a propylene group and a butylene group. The alkyl group represented by $R^7$ and $R^8$ may include, e.g., a methyl group, an ethyl group and a propyl group, and the acyl group may include an acetyl group.

As specific examples of the surface-active agent represented by the general formula (I) may include compounds represented by the following general formula (IV):

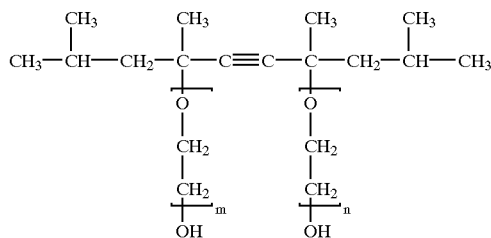

(IV)

wherein m and n are each an integer of 0 to 40, provided that m and n are not 0 at the same time and that the value of m+n is a number of 1 to 40 on the average. Compound having the general formula (IV) wherein the values of m+n are 1.3, 3.5, 10 and 30 on the average are commercially available from Nissin Chemical Industry Co., Ltd. under trade names of SURFINOL 420, 440, 465 and 485, respectively.

The other surface-active agent used in the present invention is a nonionic surface-active agent containing a perfluoroalkyl group and an alkylene oxide group. Specific examples of this surface-active agent may include alkylene oxide addition products having a polyethylene oxide chain with 10 or 20 ethylene oxide units, and more specifically include MEGAFAC F-142D and F-144D, available from Dainippon Ink & Chemicals, Incorporated, and STARGENT FT-250 and FT-250H, available from NEOS Company Limited.

These surface-active agents do not cause any change even on lapse of time which may be caused in strong alkaline conditions of an aqueous amino group-containing organopolysiloxane solution. Thus, when added to the aqueous amino group-containing organopolysiloxane solution, it gives an aqueous coating composition having superior uniform-coating properties and storage stability.

Any of these surface-active agents may be added in an amount of from 0.01 to 5% by weight, and more preferably from 0.05 to 0.2% by weight, based on the total weight of the components (A) to (C). If it is added in an amount smaller than 0.01% by weight, the surface tension does not well lower and the resultant coatings can not be uniform. Even if it is added in an amount larger than 5% by weight, the effect attributable to its addition may no longer be improved, resulting in an economical disadvantage. Other surface-active agent may also be added as long as the effect of the present invention is not damaged.

(A) Amino Group-Containing Organopolyosiloxane

There are no particular limitations on the amino group-containing organopolysiloxane used in the present invention, as long as it is water-soluble and capable of forming films. The chemical structure and composition may be selected according to its uses, purposes, desired properties and so forth.

As a preferred example of the amino group-containing organopolysiloxane, it is a hydrolysis condensation product of an amino group-containing alkoxysilane represented by the following general formula (II):

(II)

wherein $R^9$ is an amino group-substituted alkyl group, $R^{10}$ is an alkyl group having 1 to 8 carbon atoms, $R^{11}$ is an alkyl group having 1 to 6 carbon atoms, and p is an integer of 0 to 2.

In the general formula (II), the amino group-substituted alkyl group represented by $R^9$ is a group represented by the following general formula (V):

(V)

wherein $R^{14}$ is a member selected from the group consisting of a hydrogen atom, a phenyl group, an alkyl group having 1 to 6 carbon atoms and a group represented by the following general formula (VI):

(VI)

wherein $R^{16}$ and $R^{17}$ are each independently a group selected from a hydrogen atom and an alkyl group having 1 to 6 carbon atoms, and x is an integer of 1 to 12; and $R^{15}$ is a group selected from a hydrogen atom and an alkyl group having 1 to 6 carbon atoms, and y is an integer of 1 to 12.

The amino group-substituted alkyl group may include, e.g., a γ-aminopropyl group, an N-(β-aminoethyl)-γ-aminopropyl group, an N-cyclohexyl-γ-aminopropyl group, and a γ-anilinopropyl group. The alkyl group represented by $R^{10}$ may include groups exemplified for the above $R^1$. Also, the alkyl group represented by $R^{11}$ may include, e.g., a methyl group, an ethyl group and a propyl group.

In the above general formula (V), the alkyl group represented by $R^{14}$ and $R^{15}$ may include, e.g., a methyl group, an ethyl group and a propyl group. In the general formula (VI), the alkyl group represented by $R^{16}$ and $R^{17}$ may include, e.g., a methyl group, an ethyl group and a propyl group.

As other preferred example of the amino group-containing organopolysiloxane, it may include a co-hydrolysis-condensation product of i) an amino group-containing alkoxysilane represented by the following general formula (II):

(II)

wherein $R^9$, $R^{10}$, $R^{11}$ and P are as defined above; and ii) an alkoxysilane group represented by the following general formula (III):

(III)

wherein $R^{12}$ is a group selected from an alkyl group having 1 to 6 carbon atoms, a substituted alkyl group, an aryl group and a vinyl group; and R $^3$is an alkyl group having 1 to 6 carbon atoms; and a is an integer of 1 to 4.

In the above general formula (III), the alkyl group represented by $R^{12}$ may include, e.g., a methyl group, an ethyl group and a propyl group, the substituted alkyl group may include, e.g., a chloromethyl group, a chloropropyl group and a trifluoropropyl group, and the aryl group may include, e.g., a phenyl group. The alkyl group represented by $R^{13}$ may include, e.g., a methyl group, an ethyl group and a propyl group.

The amino group-containing organopolysiloxane which may be used in the present invention, is obtained by subjecting the amino group-containing alkoxysilane represented by the general formula (II) or a mixture of the amino group-containing alkoxysilane represented by the general formula (II) and the alkoxysilane group represented by the general formula (III), to hydrolysis and condensation reaction in the presence of water.

The amino group-containing alkoxysilane represented by the general formula (II) and the alkoxysilane group represented by the general formula (III) may suitably be mixed in such a proportion that the latter is from 3 to 100 parts by weight, and preferably from 5 to 50 parts by weight, based on 100 parts by weight of the former. If the latter is in a proportion larger than the above range, the co-hydrolysis-condensation product obtained does not dissolve or disperse stably in the water, resulting in a poor storage stability. If on the other hand the latter is less than the above range, the films obtained may have a poor resistance to water, undesirably.

The water used in the hydrolysis may suitably be in an quantity which comes to at least 0.5 mole, and preferably at least 1 mole, per mole of a hydrolyzable functional group. If the water is in a quantity smaller than that, the hydrolyzable functional group can not be hydrolyzed in its entire quantity, and an alcohol may be produced on lapse of time after dilution with water.

When the hydrolysis condensation reaction is carried out, as a solvent an alcohol may be made present together with the water in order to prevent gelation. Such an alcohol may include, e.g., methanol, ethanol, propanol, isopropanol and butanol.

The hydrolysis condensation reaction may preferably be carried out in a process of carrying out the reaction usually at 40 to 80° C., and preferably at 45 to 70° C., for 1 to 5 hours. Processes are by no means limited thereto.

In the amino group-containing organopolysiloxane thus obtained, an alcohol remains in its solution because an alcohol is produced as a result of the hydrolysis condensation reaction described above and because an alcohol may be used as a solvent. Accordingly, the alcohol may be desirably removed by evaporation. Especially when there are problems that any remaining alcohol dissolves substrates or lowers uniform coating properties, a product from which the alcohol has been evaporated off may preferably be used.

Aqueous Coating Composition

To obtain the aqueous coating composition, diluting water may be added to an aqueous amino group-containing organopolysiloxane solution obtained as described above from which the alcohol has been removed. It may be so added that the aqueous solution obtained finally be in a solid content of from 5 to 60% by weight, and particularly preferably from 10 to 40% by weight.

Here, the alcohol contained in the aqueous coating composition is controlled to be in an amount of 10% by weight or less, preferably 3% by weight or less, and particularly preferably 1% by weight or less. If it is in an amount more than 10% by weight, it may cause a problem on environment, may attack coating objects comprised of organic resins or the like by dissolution or swelling, or may lower uniform coating properties.

The aqueous coating composition of the present invention may be applied or coated on the surfaces of objects by, e.g., brushing, spraying, roll coating, dipping or spin coating, followed by curing at normal temperatures or an elevated temperature, or by baking at a temperature of 300° C. or lower to form a cured or hardened coating film.

The objects to be coated may include various coating objects such as inorganic ceramic substrates, metallic substrates made of stainless steel or aluminum, glass substrates, plastic substrates, metals for semiconductor devices, metal oxides, and organic resin substrates.

EXAMPLES

The present invention is described below in greater detail by giving Examples and Comparative Examples. The present invention is by no means limited by the following Examples.

Example 1

-Synthesis of Amino Group-Containing Organopolysiloxane (a)-

Into a 1-liter reaction vessel made of glass, having a stirrer, a reflux condenser and a thermometer, 456 g of water was put and then 252 g (1.14 moles) of γ-aminopropyltriethoxysilane was added with stirring. After heat generation became gentle, the resultant mixture was heated to 60 to 70° C. and kept thereat for 1 hour. An ester adapter was attached to the reaction vessel, which was then heated until the internal temperature came to 100° C., and the alcohol produced and the water were distilled off to obtain 347 g of an amino group-containing organopolysiloxane (solid content: 36.3% by weight) as a pale yellow liquid.

-Preparation of Aqueous Coating Composition-

To 81 g of the above pale yellow liquid, 213 g of water and 0.588 g of a surface-active agent SURFINOL 465 [available from Nissin Chemical Industry Co., Ltd.; a surface-active agent represented by the general formula (IV)] were added to obtain 294.5 g of an aqueous coating composition (solid content: 10% by weight). In this composition, the surface-active agent was in a content of 0.2% by weight, and any alcohol content was not detected.

Evaluation:

Surface tension of the aqueous coating composition was measured with a CBVP-system surface tension meter A-3 (manufactured by Kyowa Kaimen Kagaku K.K.). The results are shown in Table 1.

4 mL of the aqueous coating composition was dropped on a 6-inch polished silicon wafer, and was coated by means of a spin coater 1H-360S (manufactured by Mikasa K.K.) under conditions of 2,500 rpm and 60 seconds, followed by baking at 100° C. for 5 minutes. Here, the coating was in a thickness of 200 nm. Its external appearance was visually observed, and a case in which none of streaks, spots and unevenness were seen was evaluated as good (marked "○"); a case in which less than 10 streaks, spots and unevenness were seen, as a little poor (marked "Δ"), and a case in which 10 or more streaks, spots and unevenness were seen, as poor (marked "X"). The results are shown in Table 1.

The aqueous coating composition was stored at 50° C. for 3 days, and thereafter evaluated in the same manner as the above. The results are shown in Table 1.

Example 2

An aqueous coating composition was obtained in the same manner as in Example 1 except that, when the aqueous coating composition was prepared, the surface-active agent SURFINOL 465 [available from Nissin Chemical Industry Co., Ltd.; a surface-active agent represented by the general formula (IV)] was added in an amount changed to 0.147 g. In this composition, the surface-active agent was in a content of 0.05% by weight. Using this composition, evaluation was made in the same manner as in Example 1. The results are shown in Table 1.

Example 3

An aqueous coating composition was obtained in the same manner as in Example 1 except that, when the aqueous coating composition was prepared, in place of the surface-active agent SURFINOL 465 (available from Nissin Chemical Industry Co., Ltd.), MEGAFAC F-144D (available from Dainippon Ink & Chemicals, Incorporated; the nonionic surface-active agent containing a perfluoroalkyl group and an alkylene oxide group) was used. In this composition, the surface-active agent was in a concentration of 0.2% by weight. Using this composition, evaluation was made in the same manner as in Example 1. The results are shown in Table 1.

Example 4

An aqueous coating composition was obtained in the same manner as in Example 1 except that, when the aqueous coating composition was prepared, in replace of the surface-active agent SURFINOL 465 (available from Nissin Chemical Industry Co., Ltd.), STARGENT FT-250H (available from NEOS Company Limited; the nonionic surface-active agent containing a perfluoroalkyl group and an alkylene oxide group) was used. In this composition, the surface-active agent was in a concentration of 0.2% by weight. Using this composition, evaluation was made in the same manner as in Example 1. The results are shown in Table 1.

Example 5

-Synthesis of Amino Group-Containing Organopolysiloxane (b)-

Into a 1-liter reaction vessel made of glass, having a stirrer, a reflux condenser and a thermometer, 288 g of water and 288 g of methanol were put and then a mixture of 88.2 g (0.399 mole) of γ-aminopropyltriethoxysilane and 23.3 g (0.171 mole) of methyltrimethoxysilane was dropwise added over a period of 10 minutes with stirring. After the addition was completed and heat generation became gentle, the resultant mixture was heated to 60 to 70° C. and kept thereat for 1 hour. An ester adapter was attached to the reaction vessel, which was then heated until the internal temperature came to 99° C., and the alcohol produced and the water were evaporated off. Thereafter, 37 g of water was added to obtain 240 g of an amino group-containing organopolysiloxane (solid content: 25.4% by weight) as a slightly yellow liquid.

Using this liquid, an aqueous coating composition with a solid content of 10% by weight was obtained in the same manner as in Example 1 and was evaluated in the same way. The results are shown in Table 1. In this aqueous coating composition, the surface-active agent was in a content of 0.2% by weight, and the alcohol content was 0.6% by weight.

Example 6

-Synthesis of Amino Group-Containing Organopolysiloxane (c)-

Into a 1-liter reaction vessel made of glass, having a stirrer, a reflux condenser and a thermometer, 288 g of water was put and then a mixture of 126 g (0.57 mole) of γ-aminopropyltriethoxysilane and 3.4 g (0.0285 mole) of dimethyldimethoxysilane was introduced with stirring. After heat generation became gentle, the resultant mixture was heated to 60 to 70° C. and kept thereat for 1 hour. An ester adapter was attached to the reaction vessel, which was then heated until the internal temperature came to 100° C., and the alcohol produced and the water were evaporated off. Thus, 198 g of an amino group-containing organopolysiloxane (solid content: 36.4% by weight) was obtained as a slightly yellow liquid.

Using this liquid, an aqueous coating composition with a solid content of 10% by weight was obtained in the same manner as in Example 1 and was evaluated in the same way. The results are shown in Table 1. In this aqueous coating composition, the surface-active agent was in a content of 0.2% by weight, and any alcohol content was not detected.

Example 7

-Synthesis of Amino Group-Containing Organopolysiloxane (d)-

Into a 1-liter reaction vessel made of glass, having a stirrer, a reflux condenser and a thermometer, 288 g of water and 288 g of methanol were put and then a mixture of 82.2 g (0.399 mole) of N-β-(aminoethyl)-γ-aminopropylmethyldimethoxysilane and 23.3 g (0.171 mole) of methyltrimethoxysilane was dropwise added with stirring. After heat generation became gentle, the resultant mixture was heated to 60 to 70° C. and kept thereat for 1 hour. An ester adapter was attached to the reaction vessel, which was then heated until the internal temperature came to 100° C., and the alcohol produced and the water were evaporated off. Thereafter, 50 g of water was added to obtain 287 g of an amino group-containing organopolysiloxane (solid content: 22.3% by weight) as a pale yellow liquid.

Using this liquid, an aqueous coating composition with a solid content of 10% by weight was obtained in the same manner as in Example 1 and was evaluated in the same way. The results are shown in Table 1. In this aqueous coating composition, the surface-active agent was in a content of 0.2% by weight, and any alcohol content was not detected.

Comparative Example 1

An aqueous coating composition was obtained in the same manner as in Example 1 except that, when the aqueous coating composition was prepared, the surface-active agent SURFINOL 465 [available from Nissin Chemical Industry Co., Ltd.; a surface-active agent represented by the general formula (IV)] was added in an amount changed to 0.015 g. In this composition, the surface-active agent was in a content of 0.005% by weight. Using this composition, evaluation was made in the same manner as in Example 1. The results are shown in Table 2.

Comparative Example 2

An aqueous coating composition was obtained in the same manner as in Example 1 except that, when the aqueous coating composition was prepared, the surface-active agent SURFINOL 465 (available from Nissin Chemical Industry Co., Ltd.) was not added. Using this composition, evaluation was made in the same manner as in Example 1. The results are shown in Table 2.

Comparative Examples 3 to 15

Aqueous coating compositions were obtained in the same manner as in Example 1 except that, when the aqueous coating composition was prepared, in place of the surface-active agent SURFINOL 465 (available from Nissin Chemical Industry Co., Ltd.), the following surface-active agents were used. Using these compositions, evaluation was made in the same manner as in Example 1. The results are shown in Tables 2 and 3. In these compositions, the surface-active agent was in a content of 0.2% by weight.

Surface-active agent A: X-24-6852A (available from Shin-Etsu Chemical Co., Ltd.; polyglycerol-modified silicone)

Surface-active agent B: KF641 (available from Shin-Etsu Chemical Co., Ltd.; polyether-modified silicone)

Surface-active agent C: SURFINOL 82W (available from Nissin Chemical Industry Co., Ltd.; 3,6-dimethyl-4-octyne-3,6-diol)

Surface-active agent D: SURFINOL 61 (available from Nissin Chemical Industry Co., Ltd.; 3,5-dimethyl-1-hexyn-3-ol)

Surface-active agent E: ORFIN A (available from Nissin Chemical Industry Co., Ltd.; 2,5-dimethylhexane-2,5-diol)

Surface-active agent F: ORFIN B (available from Nissin Chemical Industry Co., Ltd.; 3-methyl-1-butyn-3-ol)

Surface-active agent G: ORFIN P (available from Nissin Chemical Industry Co., Ltd.; 3-methyl-1-pentyn-3-ol)

Surface-active agent H: ORFIN Y (available from Nissin Chemical Industry Co., Ltd.; 2,5-dimethyl-3-hexyne-2,5-diol)

Surface-active agent I: MEGAFAC F-160 (available from Dainippon Ink & Chemicals, Incorporated; perfluoroalkyl aminosulfonate)

Surface-active agent J: SURFLON S-131 (available from Asahi Glass Co., Ltd; perfluoroalkyl betaine)

Surface-active agent K: SURFLON S-141 (available from Asahi Glass Co., Ltd; perfluoroalkylamine oxide)

Surface-active agent L: AMYT 105 (available from Kao Corporation; polyoxyethylene alkylamine)

Surface-active agent M: AMYT 320 (available from Kao Corporation; polyoxyethylene stearylamino ether)

Comparative Examples 16 to 26

Aqueous coating compositions were obtained in the same manner as in Example 1 except that, when the aqueous coating composition was prepared, in place of the surface-active agent SURFINOL 465 (available from Nissin Chemical Industry Co., Ltd.), the following surface-active agents were used. In the cases when the following surface-active agents were used, however, the coating compositions obtained were seen to have caused faulty mixing such as milkiness and flotation, and were not evaluated after all.

SURFINOL 104PA (available from Nissin Chemical Industry Co., Ltd.; 2,4,7,9-tetramethyl-5-decyne-4,7-diol)

SURFINOL 504 (available from Nissin Chemical Industry Co., Ltd.; acetylene diol type)

SURFINOL DF-110D (available from Nissin Chemical Industry Co., Ltd.; acetylene diol type)

SURFINOL SE-F (available from Nissin Chemical Industry Co., Ltd.; acetylene diol type)

SURFINOL PSA-204 (available from Nissin Chemical Industry Co., Ltd.; acetylene diol type)

DAINOL 604 (available from Nissin Chemical Industry Co., Ltd.; acetylene diol type)

ANHITOL 86B (available from Kao Corporation; stearyl betaine)

MEGAFAC F-120 (available from Dainippon Ink & Chemicals, Incorporated; perfluoroalkyl carboxylate)

STARGENT FT-400 (available from NEOS Company Limited; perfluoroalkenyloxyaralkyl betaine)

FLUORAD FC-93 (available from Sumitomo 3M Limited; ammonium perfluoroalkyl sulfonate)

SURFLON S-111 (available from Asahi Glass Co., Ltd; perfluoroalkyl carboxylate)

Comparative Example 27

-Synthesis of Amino Group-Containing Organopolysiloxane (e)-

Into a 1-liter reaction vessel made of glass, having a stirrer, a reflux condenser and a thermometer, 456 g of water was put and then 252 g (1.41 moles) of γ-aminopropyltriethoxysilane was introduced with stirring. After heat generation became gentle, the resultant mixture was heated to 60 to 70° C. and kept thereat for 1 hour. Thus, 699 g of a pale yellow liquid (solid content: 18.2% by weight) was obtained. Using this liquid, an aqueous coating composition with a solid content of 10% by weight was obtained in the same manner as in Example 1 and was evaluated in the same way. The results are shown in Table 3. In this aqueous coating composition, the surface-active agent was in a content of 0.2% by weight, and the alcohol content was 12.5% by weight.

TABLE 1

| Example | 1 | 2 | 3 | 4 | 5 | 6 | 7 |
|---|---|---|---|---|---|---|---|
| Amino group-containing organopolysiloxane: | a | a | a | a | b | c | d |
| Surface-active agent: | SURFINOL 465 | SURFINOL 465 | MEGAFAC F-144D | STARGENT FT-250H | SURFINOL 465 | SURFINOL 465 | SURFINOL 465 |
| Amount of surface-active agent (wt. %): | 0.2 | 0.05 | 0.2 | 0.2 | 0.2 | 0.2 | 0.2 |
| Surface tension (dyne/cm): | 31.6 | 38.2 | — | — | 33.5 | 31.6 | 32.2 |
| External appearance: | ○ | ○ | ○ | ○ | ○ | ○ | ○ |
| External appearance*: | ○ | ○ | ○ | ○ | ○ | ○ | ○ |

*Coating solution having been stored at 50° C. for 3 days was coated.

TABLE 2

| Comparative Example | 1 | 2 | 3 | 4 | 5 | 6 | 7 | 8 |
|---|---|---|---|---|---|---|---|---|
| Amino group-containing organopolysiloxane: | a | a | a | a | a | a | a | a |
| Surface-active agent: | SURFINOL 465 | — | A | B | C | D | E | F |
| Amount of surface-active agent (wt. %): | 0.005 | 0 | 0.2 | 0.2 | 0.2 | 0.2 | 0.2 | 0.2 |
| Surface tension (dyne/cm): | 48.0 | 64.4 | — | — | — | — | — | — |
| External appearance: | Δ | X | ○ | ○ | X | X | X | Δ |
| External appearance*: | X | X | X | X | X | X | X | Δ |

*Coating solution having been stored at 50° C. for 3 days was coated.

TABLE 3

| Comparative Example | 9 | 10 | 11 | 12 | 13 | 14 | 15 | 27 |
|---|---|---|---|---|---|---|---|---|
| Amino group-containing organopolysiloxane: | a | a | a | a | a | a | a | e |
| Surface-active agent: | G | H | I | J | K | L | M | SURFINOL 465 |

TABLE 3-continued

| Comparative Example | 9 | 10 | 11 | 12 | 13 | 14 | 15 | 27 |
|---|---|---|---|---|---|---|---|---|
| Amount of surface-active agent (wt. %): | 0.2 | 0.2 | 0.2 | 0.2 | 0.2 | 0.2 | 0.2 | 0.2 |
| Surface tension (dyne/cm): | — | — | — | — | — | — | — | — |
| External appearance: | Δ | X | X | Δ | X | Δ | Δ | X |
| External appearance*: | Δ | X | X | X | X | Δ | Δ | X |

*Coating solution having been stored at 50° C. for 3 days was coated.

As can be seen from Table 1, in Examples 1 to 7, in which a coating composition of the present invention was used, the compositions all had superior storage stability and formed uniform coating films.

On the other hand, some coating compositions of Comparative Examples were not made into uniform coating solutions or some did not form any uniform coating films. Also, even when some coating compositions attained uniform coating films, they showed the phenomenon of deterioration with time, having a poor storage stability.

The aqueous coating composition of the present invention has superior storage stability. Also, especially when coated on flat-plate surfaces, uniform coating films can be formed. Thus, the present composition can preferably be utilized as a primer paint for metal or metal oxide surfaces or as a material for the formation of organic glass films in semiconductor device fabrication processes.

What is claimed is:

1. An aqueous coating composition comprising (A) an amino group-containing organopolysiloxane, (B) water and (C) at least one of
   (i) a surface-active agent represented by the following general formula (I):

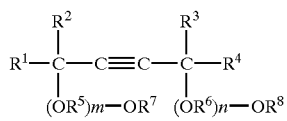

(I)

wherein $R^1$ to $R^4$ are each independently an alkyl group having 1 to 8 carbon atoms, $R^5$ and $R^6$ are each independently an alkylene group having 1 to 6 carbon atoms, $R^7$ and $R^8$ are each independently a member selected from the group consisting of a hydrogen atom, an alkyl group having 1 to 6 carbon atoms and an acyl group having 2 to 6 carbon atoms, and m and n are each an integer of 0 to 40, provided that in and n are not 0 at the same time and that the value of m+n is a number of 1 to 40 on the average; and
   (ii) a nonionic surface-active agent containing a perfluoroalkyl group and an alkylene oxide group;
   the component (C) being present in a content of from 0.01% by weight to 5% by weight based on the total weight of the components (A), (B) and (C), and an alcohol being present in the composition in an amount not more than 10% by weight of the total weight of the composition
   wherein
      (A) is a hydrolysis-condensation product of an amino group-containing alkoxysilane represented by the following general formula (II):

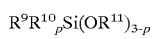

(II)

wherein $R^9$ is an amino group-substituted alkyl group, $R^{10}$ is an alkyl group having 1 to 8 carbon atoms, $R^{11}$ is an alkyl group having 1 to 6 carbon atoms, and p is an integer of 0 to 2; or
      (A) is a co-hydrolysis-condensation product of an amino group-containing alkoxysilane represented by the following general formula (II):

(II)

wherein $R^9$, $R^{10}$ and $R^{11}$ are as defined above; and an alkoxysilane represented by the following general formula (III):

(III)

wherein $R^{12}$ is a group selected from an alkyl group having 1 to 6 carbon atoms, a substituted alkyl group, an aryl group and a vinyl group and $R^{13}$ is an alkyl group having 1 to 6 carbon atoms; and a is an integer of 1 to 4.

2. The composition according to claim 1, wherein (C) is the surface-active agent (i) and is represented by the following general formula (IV):

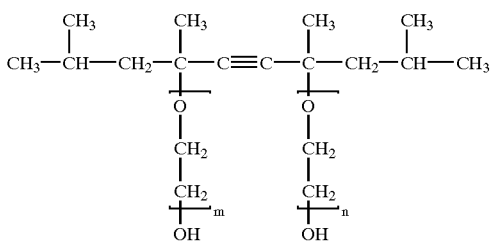

(IV)

wherein m and n are each an integer of 0 to 40, provided that in and n are not 0 at the same time and that the value of m+n is a number of 1 to 40 on the average.

3. The composition according to claim 1, wherein (C) is the nonionic surface-active agent containing a perfluoroalkyl group and an alkylene oxide group (ii) and has a polyalkylene oxide chain with 10 to 20 ethylene oxide units.

4. The composition according to claim 1, wherein the component (C) is present in an amount of 0.05 to 0.2% by weight based on the total weight of the components (A), (B) and (C).

5. The composition according to claim 1, wherein the amino group-substituted alkyl group represented by $R^9$ is a group represented by the following general formula (V):

(V)

wherein $R^{14}$ is a member selected from the group consisting of a hydrogen atom, a phenyl group, an alkyl group having 1 to 6 carbon atoms and a group represented by the following general formula (VI):

(VI)

wherein $R^{16}$ and $R^{17}$ are each independently a group selected from a hydrogen atom and an alkyl group having 1 to 6 carbon atoms, an x is an integer of 1 to 12; and $R^{15}$ is a member selected from the group consisting of a hydrogen atom and an alkyl group having 1 to 6 carbon atoms, and y is an integer of 1 to 12.

6. The composition according to claim 1, wherein said co-hydrolysis-condensation product is produced from the hydrolysis and condensation of the amino group-containing alkoxysilane represented by the general formula (II) in an amount of 100 parts by weight and the alkoxysilane group represented by the general formula (III) in an amount of 3 to 100 parts by weight.

7. The composition according to claim 1, wherein said alcohol is present in an amount not more than 3% by weight of the total weight of the composition.

8. A coating film obtained by curing or baking the composition as defined in claim 1 applied on an object.

9. The composition according to claim 1, wherein the amino group-containing organopolysiloxane of the component (A) is a hydrolysis-condensation product of an amino group-containing alkoxsilane of the general formula (II) and p in the general formula (II) is 0.

10. The composition according to claim 1, wherein the amino group-containing organopolysiloxane of the component (A) a co-hydrolysis-condensation product of an amino group-containing alkoxysilane of the general formula (II) and an alkoxysilane of the general formula (III) and p in the general formula (II) is 0 and/or a in the general formula (III) is 3.

11. An aqueous coating composition comprising (A) an amino group-containing organopolysiloxane, (B) water and (C) a nonionic surface-active agent containing a perfluoxoalkyl group and an alkylene oxide group;
the component (C) being present in a content of from 0.01% by weight to 5% by weight based on the total weight of the components (A), (B) and (C), and an alcohol being present in the composition in an amount riot more than 10% by weight of the total weight of the composition.

12. The composition according to claim 11, wherein the nonionic surface-active agent of the component (C) has a polyalkylene oxide chain with 10 to 20 ethylene oxide units.

13. The composition according to claim 11, wherein the component (C) is present in an amount of 0.05 to 0.2% by weight based on the total weight of the components (A), (B) and (C).

14. The composition according to claim 11, wherein said amino group-containing organopolysiloxane of the component (A) is a hydrolysis-condensation product of an amino group-containing alkoxysilane represented by the following general formula (II):

  (II)

wherein $R^9$ is an amino group-substituted alkyl group, $R^{10}$ is an alkyl group having 1 to 8 carbon atoms, $R^{11}$ is an alkyl group having 1 to 6 carbon atoms, and p is an integer of 0 to 2.

15. The composition according to claim 14, wherein p in the general formula (II) is 0.

16. The composition according to claim 11, wherein said amino group-containing organopolysiloxane of the component (A) is a co-hydrolysis-condensation product of an amino group-containing alkoxysilane represented by the following general formula (II):

  (II)

wherein $R^9$, $R^{10}$ and $R^{11}$ are as defined above; and an alkoxysilane represented by the following general formula (III):

  (III)

wherein $R^{12}$ is a group selected from an alkyl group having 1 to 6 carbon atoms, a substituted alkyl group, an aryl group and a vinyl group; and $R^{13}$ is an alkyl group having 1 to 6 carbon atoms; and a is an integer of 1 to 4.

17. The composition according to claim 16, wherein p in the general formula (II) is 0 and/or a in the general formula (III) is 3.

18. The composition according to claim 16, wherein said co-hydrolysis-condensation product is produced from e hydrolysis and condensation of the amino group-containing alkoxysilane represented by e general formula (II) in an amount of 100 parts by weight and the alkoxysilane group represented by the general formula (III) in an amount of 3 to 100 parts by weight.

19. A coating film obtained by curing or baking the composition as defined in claim applied on an object.

* * * * *